US010224707B2

(12) United States Patent
Nakada et al.

(10) Patent No.: US 10,224,707 B2
(45) Date of Patent: Mar. 5, 2019

(54) ELECTRONIC COMPONENT FUSE AND FUSED ELECTRONIC COMPONENT MODULE

(71) Applicant: TAIYO YUDEN CO., LTD., Taito-ku, Tokyo (JP)

(72) Inventors: Yousuke Nakada, Takasaki (JP); Kenji Matsumoto, Takasaki (JP); Tetsuo Shimura, Takasaki (JP); Kazuya Sato, Takasaki (JP)

(73) Assignee: TAIYO YUDEN CO., LTD, Tokyo (JP)

( * ) Notice: Subject to any disclaimer, the term of this patent is extended or adjusted under 35 U.S.C. 154(b) by 0 days.

(21) Appl. No.: 15/497,017

(22) Filed: Apr. 25, 2017

(65) Prior Publication Data

US 2017/0317484 A1   Nov. 2, 2017

(30) Foreign Application Priority Data

Apr. 27, 2016   (JP) .................................. 2016-089795

(51) Int. Cl.
*H02H 3/08*   (2006.01)
*G05B 9/02*   (2006.01)
(Continued)

(52) U.S. Cl.
CPC ................. *H02H 3/08* (2013.01); *G05B 9/02* (2013.01); *H01G 2/16* (2013.01); *H01G 4/40* (2013.01);
(Continued)

(58) Field of Classification Search
CPC ... H02H 3/08; H02H 1/00; G05B 9/02; G05B 9/00; H01G 9/0003; H01G 4/30;
(Continued)

(56) References Cited

U.S. PATENT DOCUMENTS 4,503,415 A * 3/1985 Rooney et al. ........ H01H 85/04
337/160
5,621,602 A * 4/1997 Winkelmann ........... H02H 9/04
361/104

(Continued)

FOREIGN PATENT DOCUMENTS

JP   2005116642 A   4/2005
JP   2005123516 A   5/2005

*Primary Examiner* — Angel R Estrada
(74) *Attorney, Agent, or Firm* — Law Office of Katsuhiro Arai (57) ABSTRACT

In an embodiment, an electronic component fuse 10 includes: (1) an insulator sleeve 11 having a hollow part 11a that opens to the exterior at both ends; (2) a conductor element 12 having a fusible part 12a whose cross-section is smaller than the cross-section of the hollow part 11a, a first engagement part 12b provided at one end of the fusible part 12a, and a second engagement part 12c provided at the other end of the fusible part 12a, where the fusible part 12a is positioned in the hollow part 11a, the first engagement part 12b and the second engagement part 12c are disposed on the respective ends of the insulator sleeve 11; (3) a first terminal 13 having a first connection part 13a connected to the first engagement part 12b; and (4) a second terminal 14 having a second connection part 14a connected to the second engagement part 12c.

19 Claims, 4 Drawing Sheets

(51) Int. Cl.
  *H01G 9/00* (2006.01)
  *H01H 85/055* (2006.01)
  *H02H 1/00* (2006.01)
  *H01G 4/40* (2006.01)
  *H01G 2/16* (2006.01)
  *H01G 4/30* (2006.01)

(52) U.S. Cl.
  CPC ........ *H01G 9/0003* (2013.01); *H01H 85/055* (2013.01); *H02H 1/00* (2013.01); *H01G 4/30* (2013.01)

(58) Field of Classification Search
  CPC .. H01G 5/00; H01G 5/01; H01G 4/00; H01H 85/055; H01H 85/43; H01H 85/08; H01H 85/175; H01H 85/02; H02G 3/08
  USPC ..... 361/534, 535, 541; 174/5 R, 5 SB, 5 SG, 174/113 R
  See application file for complete search history.

(56) References Cited

U.S. PATENT DOCUMENTS

| | | | | |
|---|---|---|---|---|
| 5,844,761 A * | 1/1998 | Place, IV | ................ | H02H 5/04 361/104 |
| 5,793,275 A * | 8/1998 | Iversen | ................ | H01H 85/38 337/273 |
| 6,614,340 B2 * | 9/2003 | Handcok et al. | ...... | H01H 85/12 337/292 |
| 8,314,677 B1 * | 11/2012 | Kuo | ................ | H01C 1/14 361/104 |
| 8,937,524 B2 * | 1/2015 | de Leon et al. | ............. | 337/290 |
| 9,508,517 B2 * | 11/2016 | Breili | ................ | H01H 85/00 |

* cited by examiner

ELECTRONIC COMPONENT FUSE AND FUSED ELECTRONIC COMPONENT MODULE

BACKGROUND

Field of the Invention

The present invention relates to an electronic component fuse, as well as an electronic component module using this electronic component fuse.

Description of the Related Art

In connection with the foregoing, Patent Literatures 1 and 2 disclose fuses that are each constituted by multiple metal wires partially or fully covered with insulating resin, as well as fuse-equipped (or fused) capacitor modules using these fuses.

To protect an electronic component or circuit connected to an electronic component by means of an electronic component fuse, it is desired that, if current exceeding the current rating of the electronic component or circuit, or "abnormal current," flows, this abnormal current is cut off immediately. To quickly cut off this abnormal current, a method in which the cross-section area of the fusible part of the electronic component fuse is reduced, or the like is used so as to facilitate fusing; however, doing so reduces the current rating of the electronic component fuse itself, which in turn will cause inconvenience when the fuse is applied to electronic components with higher current ratings.

BACKGROUND ART LITERATURES

[Patent Literature 1] Japanese Patent Laid-open No. 2005-116642
[Patent Literature 2] Japanese Patent Laid-open No. 2005-123516

SUMMARY

An object of the present invention is to provide an electronic component fuse that can quickly cut off current and also be applied to electronic components with higher current ratings, as well as a fuse-equipped electronic component module using this electronic component fuse.

To achieve the aforementioned object, an electronic component fuse pertaining to the present invention comprises: (1) an insulator sleeve having a hollow part that opens to the exterior at both ends; (2) a conductor element having a fusible part whose cross-section area is smaller than the cross-section area of the hollow part of the insulator sleeve, a first engagement part provided on one end of the fusible part, and a second engagement part provided on the other end of the fusible part, where the fusible part is positioned in the hollow part of the insulator sleeve, the first engagement part engages with one end of the insulator sleeve, and the second engagement part engages with the other end of the insulator sleeve; (3) a first terminal having a first connection part and a first lead part, with the first connection part connected to the first engagement part of the conductor element; and (4) a second terminal having a second connection part and a second lead part, with the second connection part connected to the second engagement part of the conductor element.

Also, a fuse-equipped electronic component module pertaining to the present invention comprises: an electronic component having at least two external electrodes; a board having conductor pads that respectively correspond to the external electrodes of the electronic component; and at least one electronic component fuse mentioned above; wherein the first lead part of the first terminal, and the second lead part of the second terminal, of the electronic component fuse, are connected to at least one of the external electrodes of the electronic component and to the corresponding conductor pad on the board, respectively.

Any discussion of problems and solutions involved in the related art has been included in this disclosure solely for the purposes of providing a context for the present invention, and should not be taken as an admission that any or all of the discussion were known at the time the invention was made.

According to the present invention, an electronic component fuse that can quickly cut off current and also be applied to electronic components with higher current ratings, as well as a fuse-equipped electronic component module using this electronic component fuse, can be provided.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 3A is a view, from one length-direction end, of the electronic component fuse shown in FIG. 1, while

DESCRIPTION OF THE SYMBOLS 10, 20, 30—Electronic component fuse, 11—Insulator sleeve, 11a—Hollow part, 11b—First groove, 11c–Second groove, 12—Conductor element, 12a—Fusible part, 12b—First engagement part, 12c—Second engagement part, 13—First terminal, 13a—First connection part, 13b—First lead part, 14—Second terminal, 14a—Second connection part, 14b—Second lead part, 15—First release direction adjustment part, 16—Second release direction adjustment part, 17—First terminal, 17a—First connection part, 17b—First lead part, 18—Second terminal, 18a—Second connection part, 18b—Second lead part, 40, 50—Fused electronic component module, 41—Board, 41a, 41b—Conductor pad, 42—Multilayer ceramic capacitor (electronic component), 42a, 42b—External electrode, 43—Terminal.

DETAILED DESCRIPTION OF EMBODIMENTS

First Embodiment

Figure 1:
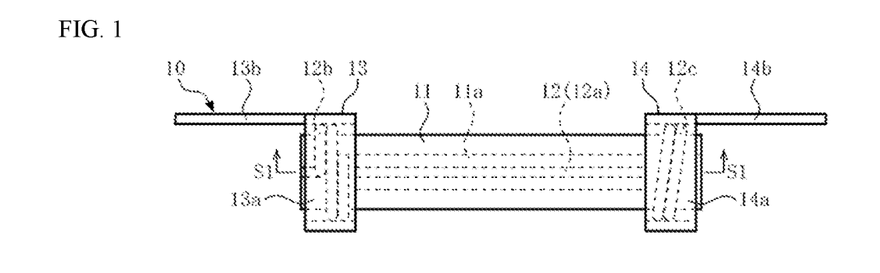
FIG. 1 is a side view of an electronic component fuse representing the first embodiment of the present invention.
Figure 2:
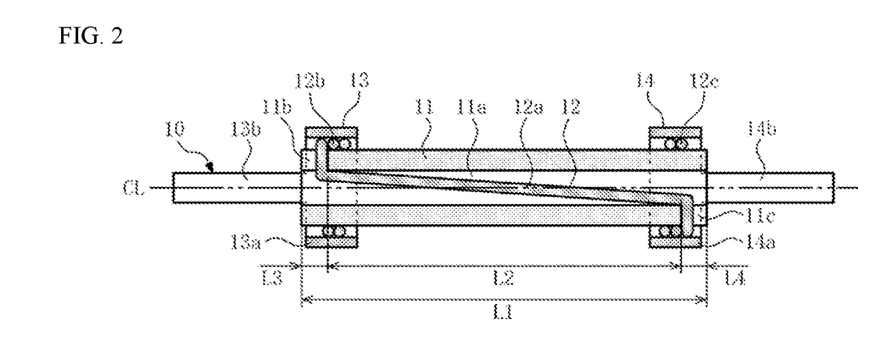
FIG. 2 is a cross sectional view of the electronic component fuse shown in FIG. 1 along line S1-S1.
Figure 3A:
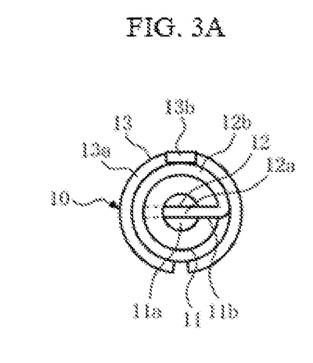
Figure 3B:
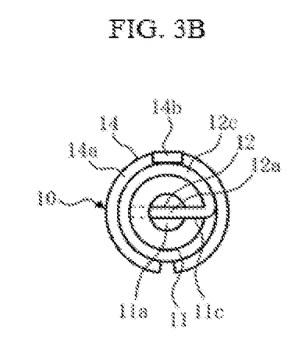
FIG. 3B is a view, from the other length-direction end, of the electronic component fuse shown in FIG. 1.

The first embodiment shown in FIGS. 1 to 5 is an embodiment of an electronic component fuse. First, the structure of the electronic component fuse 10 (hereinafter simply referred to as "fuse 10") is explained using FIGS. 1 to 3B. In this explanation, the left/right direction in FIGS. 1 and 2 is referred to as "length direction," while the dimension of each constituent along the length direction is referred to as "length."

The fuse 10 shown in FIGS. 1 to 3B comprises an insulator sleeve 11, a conductor element 12, a first terminal 13, and a second terminal 14.

The insulator sleeve 11 is shaped roughly as a cylinder specified by its length L1, outer diameter, and inner diameter, and has a hollow part 11a that opens to the outside at both ends. Additionally, provided on one end of the insulator sleeve 11 is a first groove 11b which is roughly U-shaped and extends from one end to the inside of the insulator sleeve 11, and provided on the other end of the insulator sleeve 11 is a second groove 11c which is roughly U-shaped and extends from the other end to the inside of the insulator sleeve 11.

As is evident from FIGS. 1 to 3B, the position of the first groove 11b, and the position of the second groove 11c, of the insulator sleeve 11, are offset by roughly 180 degrees in the circumferential direction with reference to the center line CL of the hollow part 11a. The length (depth) L3 of the first groove (recess) 11b is roughly the same as the length (depth) L4 of the second groove (recess) 11c, while the width of the first groove 11b is also roughly the same as the width of the second groove 11c. The width of the first groove 11b, and the width of the second groove 11c, are each a width that allows the conductor element 12 to be inserted therein, or preferably the minimum width needed to permit such insertion.

It should be noted that the actual length L, outer diameter, and inner diameter of the insulator sleeve 11 shown in FIGS. 1 to 3B are 8 mm, 1.5 mm and 0.7 mm, respectively, while the length L3 of the first groove 11b and length L4 of the second groove 11c are both 0.5 mm, and their widths are both 0.2 mm.

For the material of the insulator sleeve 11, any of various materials having insulation property, such as synthetic resin materials, ceramic materials (such as alumina, silicon nitride, mullite, etc.), glass materials (such as silica glass, etc.), rubber materials (such as ethylene propylene rubber, silicone rubber, chlorosulfonated polyethylene rubber, fluororubber, butyl rubber, etc.), etc., can be used as deemed appropriate. Considering heat generation while current is supplied in an energized state and upon blowing (separating), as well as arc blast, synthetic resins offering both heat resistance and elasticity, such as polyethylene terephthalate, polyvinylidene chloride, polypropylene, polyethylene, polyamide, polyimide, polytetrafluoroethylene, etc., can be used preferably among the foregoing. So that whether or not separating has occurred can be visually observed from outside the insulator sleeve 11, preferably the insulator sleeve 11 is transparent or semi-transparent. The thickness of the insulator sleeve 11 (calculated by (Outer diameter−Inner diameter)/2) here) is not limited by the type of material and any thickness is acceptable so long as the shape of the insulator sleeve 11 can be maintained.

The conductor element 12 is constituted by a metal wire with a roughly circular cross-section shape, and has a fusible part 12a whose cross-section area is smaller than the cross-section area of the hollow part 11a of the insulator sleeve 11, a first engagement part 12b provided on one end of the fusible part 12a, and a second engagement part 12c provided on the other end of the fusible part 12a. This conductor element 12 is such that its fusible part 12a is positioned in the hollow part 11a of the insulator sleeve 11, its first engagement part 12b engages with one end of the insulator sleeve 11, and its second engagement part 12c engages with the other end of the insulator sleeve 11. In other words, because the cross-section area of the fusible part 12a is smaller than the cross-section area of the hollow part 11a of the insulator sleeve 11, a gap filled with air exists around the fusible part 12a and this gap opens to the outside by way of both ends of the hollow part 11a.

As is evident from FIGS. 1 to 3B, the length L2 of the fusible part 12a of the conductor element 12 is shorter than the length L1 of the insulator sleeve 11, and one end of the fusible part 12a is positioned inward of one end of the hollow part 11a by the length L3, while the other end of the fusible part 12a is positioned inward of the other end of the hollow part 11a by the length L4. As mentioned earlier, the position of the first groove 11b, and the position of the second groove 11c, of the insulator sleeve 11, are offset by roughly 180 degrees in the circumferential direction with reference to the center line CL of the hollow part 11a, and consequently the fusible part 12a of the conductor element 12 is positioned at an angle to the center line CL of the hollow part 11a of the insulator sleeve 11.

Also, the first engagement part 12b of the conductor element 12 is constituted by a part where one end of the conductor element 12 that has been inserted into the hollow part 11a of the insulator sleeve 11 is led out to the outside through the first groove 11b and wound around the outer periphery of one end of the insulator sleeve 11. Preferably this wound part is tightly wound without any gap left in between, by at least 720 degrees with reference to the center line CL of the hollow part 11a. Similarly, the second engagement part 12c of the conductor element 12 is constituted by a part where the other end of the conductor element 12 that has been inserted into the hollow part 11a of the insulator sleeve 11 is led out to the outside through the second groove 11c and wound around the outer periphery of the other end of the insulator sleeve 11. Preferably this wound part is tightly wound without any gap left in between, by at least 720 degrees with reference to the center line CL of the hollow part 11a.

It should be noted that the actual diameter of the conductor element 12 shown in FIGS. 1 to 3B is 0.2 mm, while the actual length L2 of its fusible part 12a is 7 mm.

For the material of the conductor element 12, any metal material exhibiting conductivity can be used as deemed appropriate. Considering the improvement of current rating and the heat generation in an energized state, however, metals with low electrical resistivity, such as copper, silver, gold, aluminum, magnesium, tungsten, zinc, nickel, and alloys thereof, etc., can be used preferably among the metal materials, and metals whose electrical resistivity is $3.0 \times 10^{-8}$ Ωm or less can be used more preferably. Furthermore, the conductor element 12 can be a type constituted by a metal wire on whose surface a film of a different metal has been formed.

The first terminal 13 is constituted by a metal plate, and has a first connection part 13a shaped roughly as the letter C, and a first lead part 13b shaped like a belt. This first terminal 13 is such that its first connection part 13a is connected to the first engagement part 12b of the conductor element 12. The second terminal 14 is constituted by a metal plate, and has a second connection part 14a shaped roughly as the letter C, and a second lead part 14b shaped like a belt. This second terminal 14 is such that its second connection part 14a is connected to the second engagement part 12c of the conductor element 12.

As is evident from FIGS. 1 to 3B, the first connection part 13a of the first terminal 13 is connected in such a way that it surrounds the first engagement part 12b of the conductor element 12 and also tightens the first engagement part 12b. Similarly, the second connection part 14a of the second terminal 14 is connected in such a way that it surrounds the second engagement part 12c of the conductor element 12 and also tightens the second engagement part 12c. As explained in the example of production method described later, the multiple convex parts provided on the interior face of the first connection part 13a may bite into the first engagement part 12b, to further improve the connection force and connectivity of the first connection part 13a of the first terminal 13 with reference to the first engagement part 12b of the conductor element 12, and similarly, the multiple convex parts provided on the interior face of the second connection part 14a may bite into the second engagement part 12c, to further improve the connection force and connectivity of the second connection part 14a of the second terminal 14 with reference to the second engagement part 12c of the conductor element 12. Also, solder or other joining material may be used to connect the first connection part 13a of the first terminal 13 to the first engagement part 12b of the conductor element 12, and solder or other joining material may be used to connect the second connection part 14a of the second terminal 14 to the second engagement part 12c of the conductor element 12.

It should be noted that the actual thickness of the first terminal 13 and that of the second terminal 14 as shown in FIGS. 1 to 3B are both 0.2 mm, and the actual length of the first connection part 13a and that of the second connection part 14a are both 1 mm, and the actual length of the first lead part 13b and that of the second lead part 14b are both 2.6 mm, while their widths are both 0.6 mm.

For the material of the first terminal 13 and that of the second terminal 14, any metal material exhibiting conductivity can be used as deemed appropriate. Considering the improvement of current rating and the heat generation in energized state, however, metals with low electrical resistivity, such as copper, silver, gold, aluminum, magnesium, tungsten, zinc, nickel, and alloys thereof, etc., can be used preferably among the metal materials, and metals whose electrical resistivity is $3.0 \times 10^{-8}$ Ωm or less can be used more preferably. Furthermore, the first terminal 13 and second terminal 14 can each be a type constituted by a metal plate on whose surface a film of a different metal has been formed.

With the fuse 10 shown in FIGS. 1 to 3B, the first lead part 13b of the first terminal 13, and the second lead part 14b of the second terminal 14, each function as an input/output part. The resistance of the first lead part 13b and first connection part 13a of the first terminal 13, the resistance of the first engagement part 12b of the conductor element 12 to which the first connection part 13a of the first terminal 13 has been connected, the resistance of the second lead part 14b and second connection part 14a of the second terminal 14, and the resistance of the second engagement part 12c of the conductor element 12 to which the second connection part 14a of the second terminal 14 has been connected, are all lower than the resistance of the fusible part 12a of the conductor element 12. In other words, the current rating of the fuse 10 depends primarily on the resistance of the fusible part 12a of the conductor element 12, and accordingly the current rating of the fuse 10 can be set to any desired level by changing the cross-section area of the fusible part 12a.

Figure 4A:
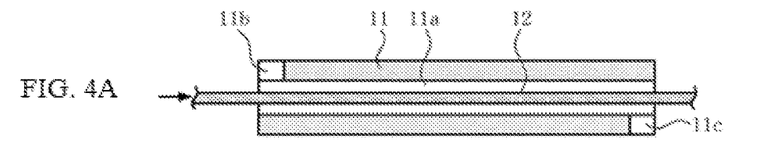
FIGS. 4A to 4C are drawings explaining an example of how the electronic component fuse shown in FIG. 1 is produced.
Figure 4B:
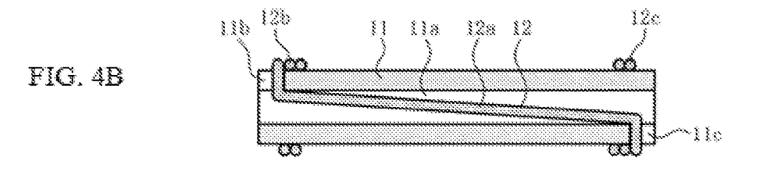
Figure 4C:
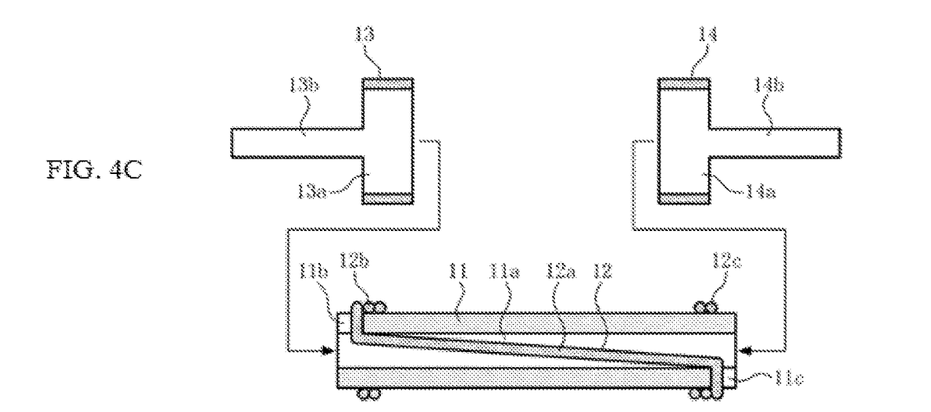

Next, FIGS. 4A to 4C are used to explain an example of how the aforementioned fuse 10 is produced. The example of production method explained here is merely one example and does not limit the production method of the fuse 10 in any way.

To produce the fuse 10, an insulation cylinder shaped roughly as a cylinder (hereinafter referred to as "insulator sleeve 11"), a metal wire of specified length (hereinafter referred to as "conductor element 12"), and two metal plates shaped roughly as the letter T (hereinafter referred to as "first terminal 13" and "second terminal 14"), are prepared. A first groove part 11b, and a second groove part 11c, are provided on both ends of the insulator sleeve 11, respectively. Also, a part corresponding to the first connection part 13a of the first terminal 13, and a part corresponding to the second connection part 14a of the second terminal 14, are rounded beforehand in roughly the shape of the letter C (their inner diameters are greater than the outer diameters of the first engagement part 12b and second engagement part 12c of the conductor element 12, respectively).

Then, as shown in FIG. 4A, the conductor element 12 is inserted into the hollow part 11a of the insulator sleeve 11, and the lengths projecting from both ends of the hollow part 11a are adjusted to roughly the same length. Then, as shown in FIG. 4B, one end of the conductor element 12 is led out to the outside through the first groove 11b and wound around the outer periphery of one end of the insulator sleeve 11 to form a first engagement part 12b, while the other end of the conductor element 12 is led out to the outside through the second groove 11c and wound around the outer periphery of the other end of the insulator sleeve 11 to form a second engagement part 12c. At this time, the fusible part 12a of the conductor element 12 is kept as straight as possible.

Then, as shown in FIG. 4C, the first connection part 13a of the first terminal 13 is placed around to cover the first engagement part 12b of the conductor element 12, while the second connection part 14a of the second terminal 14 is placed around to cover the second engagement part 12c of the conductor element 12. Then, by using a tightening die, tightening tool, etc., the first connection part 13a of the first terminal 13 is tightened and connected to the first engagement part 12b of the conductor element 12, while the second connection part 14a of the second terminal 14 is tightened and connected to the second engagement part 12c of the conductor element 12.

Sufficient connection force and connectivity of the first connection part 13a with reference to the first engagement part 12b can be ensured, and sufficient connection force and connectivity of the second connection part 14a with reference to the second engagement part 12c can also be ensured, by the aforementioned tightening; however, the following procedure may be adopted to further improve such connection force and connectivity. Specifically, as the aforementioned tightening die, tightening tool, etc., one having multiple convex parts on the tightening face is used to form multiple convex parts on the interior face of the first connection part 13a and also on the interior face of the second connection part 14a at the same time as the tightening operation, so that the multiple convex parts provided on the interior face of the first connection part 13a will bite into the first engagement part 12b, while the multiple convex parts provided on the interior face of the second connection part 14a will bite into the second engagement part 12c, thereby improving the aforementioned connection force and connectivity further. Needless to say, solder or other joining material may be used to connect the first connection part 13a of the first terminal 13 to the first engagement part 12b of the conductor element 12, while solder or other joining material may also be used to connect the second connection part 14a of the second terminal 14 to the second engagement part 12c of the conductor element 12.

Figure 5:
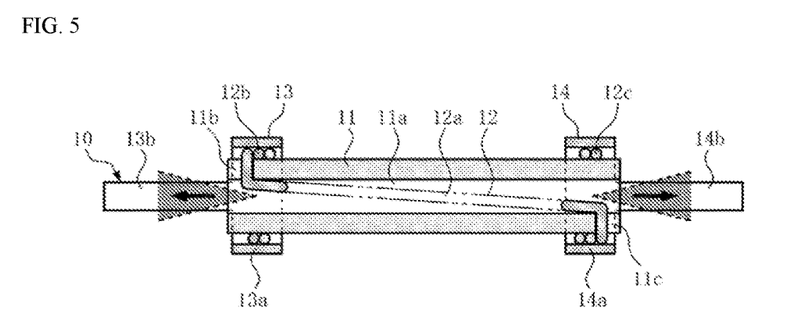
FIG. 5 is a drawing explaining the current cutoff behavior of the electronic component fuse shown in FIG. 1.

Next, FIG. 5 is used to explain the current cutoff behavior of the aforementioned fuse 10.

When current equal to or less than the aforementioned current rating flows between the first terminal 13 and second terminal 14 of the fuse 10, the fusible part 12a of the conductor element 12 generates heat based on its resistance but will not blow (open). On the other hand, if current exceeding the current rating, or "abnormal current," flows between the first terminal 13 and second terminal 14 of the fuse 10, the fusible part 12a of the conductor element 12 rapidly blows due to its own generated heat, while at the same time the air around the fusible part 12a rapidly expands because of this generated heat. To be specific, as shown in FIG. 5, the fusible part 12a of the conductor element 12 rapidly blows due to its own generated heat, while at the same time the air around the fusible part 12a rapidly expands due to heat, and consequently the melted debris and evaporated residues of the fusible part 12a, and re-aggregates thereof, etc., are rapidly released to the outside from both ends of the hollow part 11a together with the heat-expanded air. As a result, the current flowing between the first terminal 13 and the second terminal 14 is cut off without fail. It should be noted that, even when the temperature at which the fusible part 12a blows is higher than the melting point of the insulator sleeve 11, any deformation of the insulator sleeve 11 due to the heat generated by the blowing of the fusible part 12a can be prevented to the maximum extent possible, because a gap filled with air exists between the fusible part 12a and the insulator sleeve 11 and this air acts as heat-insulating material, and also because the fusible part 12a blows rapidly.

It has been confirmed by experiment that the aforementioned current cutoff behavior has to do with the ratio of the cross-section area of the fusible part 12a of the conductor element 12 and the cross-section area of the hollow part 11a of the insulator sleeve 11. To be specific, it has been confirmed by experiment that the aforementioned current cutoff behavior can be achieved more effectively so long as the value calculated by ((Cross-section area of the fusible part 12a)/(Cross-section area of the hollow part 11a))×100 (%) is within a range of 1 to 64%.

Next, the effects achieved by the aforementioned fuse 10 are explained.

The aforementioned fuse 10 is such that the fusible part 12a of the conductor element 12 is positioned in the hollow part 11a of the insulator sleeve 11, and this hollow part 11a is open to the outside at both ends. Accordingly, if current exceeding the aforementioned current rating, or "abnormal current," flows between the first terminal 13 and the second terminal 14, the fusible part 12a of the conductor element 12 rapidly blows, while at the same time the air around the fusible part 12a rapidly expands due to heat, and consequently the melted debris and evaporated residues of the fusible part 12a, and re-aggregates thereof, etc., are rapidly released to the outside from both ends of the hollow part 11a together with the heat-expanded air. In other words, because the melted debris, etc., of the fusible part 12a can be rapidly released to the outside together with the heat-expanded air, problems caused by these melted debris, etc., remaining in the hollow part 11a, such as the problem of delayed separating of the fusible part 12a due to re-attachment of the melted debris, etc., can be prevented and the desired current cutoff action can be achieved quickly.

Furthermore, the cross-section area of the fusible part 12a of the conductor element 12 can be increased to increase the current rating of the fuse 10, and even when the current rating is increased, current cutoff behavior similar to the above can still be achieved, which allows for the present invention to be applied to electronic components with higher current ratings and still achieve effects similar to the above.

Also, with the aforementioned fuse 10, one end of the fusible part 12a of the conductor element 12 is positioned inward of one end of the hollow part 11a, while the other end of the fusible part 12a is positioned inward of the other end of the hollow part 11a. As a result, any impact the fuse 10 may receive from the ambient temperature can be prevented to the maximum extent possible, while the aforementioned rapid heat expansion of the air around the fusible part 12a, as well as rapid release, to the outside, of the melted debris, etc., of the fusible part 12a due to this heat expansion, can be achieved accurately.

Furthermore, with the aforementioned fuse 10, the fusible part 12a of the conductor element 12 is positioned at an angle to the center line CL of the hollow part 11a. This prevents to the maximum extent possible the fusible part 12a from contacting the interior face of the insulator sleeve 11, and achieves the aforementioned separating of the fusible part 12a accurately.

Next, the results of verifying the aforementioned effects, especially the quick current cutoff, are explained.

To verify the effects, samples corresponding to the fuse 10 shown in FIGS. 1 to 3B, and comparative samples not corresponding to the fuse 10 shown in FIGS. 1 to 3B, were prepared. The specifications of the sample and comparative sample are as follows.

<Specification of Sample (The Symbols are the Same as Those Used in FIGS. 1 to 3B.)>

The material of the insulator sleeve 11 is polyethylene terephthalate.

The length L, outer diameter and inner diameter of the insulator sleeve 11 are 8 mm, 1.5 mm and 0.7 mm, respectively.

The length L3 of the first groove 11b, and the length L4 of the second groove 11c, of the insulator sleeve 11, are both 0.5 mm, and their widths are both 0.2 mm.

The material of the conductor element 12 is copper, and its wire diameter is 0.2 mm.

The length L2 of the fusible part 12a of the conductor element 12 is 7 mm.

The first engagement part 12b and second engagement part 12c of the conductor element 12 are each wound twice (720 degrees).

The material of the first terminal 13 and that of the second terminal 14 are both copper, and their thicknesses are both 0.2 mm.

The length of the first connection part 13a of the first terminal 13 and that of the second connection part 14a of the second terminal 14 are both 1 mm.

The length and width of the first lead part 13b of the first terminal 13, and those of the second lead part 14b of the second terminal 14, are both 2.6 mm and 0.6 mm, respectively.

<Specification of Comparative Sample (The Symbols are the Same as Those Used in FIGS. 1 to 3B.)>

Same as with the aforementioned sample, except that both ends of the hollow part 11a of the insulator sleeve 11 are sealed by epoxy resin (the epoxy resin does not contact the fusible part 12a).

The sample and comparative sample based on the aforementioned specifications had a current rating of 30 A, so 1000 A of current that exceeds this current rating was applied between the first terminal 13 and second terminal 14 and the time from the start of current flow to the cutoff of current (current cutoff time) was measured with 10 samples and 10 comparative samples. An oscilloscope MDO4054B-3 (manufactured by TEKTRONIX) was used for this measurement of current cutoff time. As a result of measurement, the average current cutoff time of samples was 1 msec, while the average current cutoff time of comparative samples was 36 msec, confirming that the samples could cut off current more quickly.

Next, variation examples of the aforementioned fuse 10 are explained.

Variation Example 1

While the insulator sleeve 11 shown in FIGS. 1 to 3B is shaped roughly as a cylinder, the insulator sleeve 11 may be shaped roughly as an elliptical cylinder or polygonal cylinder. Also, while the conductor element 12 shown in FIGS. 1 to 3B is constituted by a metal wire with a roughly circular cross-section shape, the cross-section of the conductor element 12 may have an elliptical or roughly polygonal shape.

Variation Example 2

While the insulator sleeve 11 shown in FIGS. 1 to 3B is such that the position of the first groove 11b, and the position of the second groove 11c, are offset by roughly 180 degrees in the circumferential direction with reference to the center line CL of the hollow part 11a, the fusible part 12a of the conductor element 12 can be positioned at an angle to the center line CL of the hollow part 11a so long as the offset angle is within a range of approx. 90 degrees to approx. 270 degrees.

Variation Example 3

While, in FIGS. 1 to 3B, the position of the first lead part 13b of the first terminal 13, and the position of the second lead part 14b of the second terminal 14, are not offset in the circumferential direction with reference to the center line CL of the hollow part 11a, the position of the first lead part 13b of the first terminal 13, and the position of the second lead part 14b of the second terminal 14, may be offset, according to the layout pattern of the fuse 10, in the circumferential direction with reference to the center line CL of the hollow part 11a.

Variation Example 4

While, in FIGS. 1 to 3B, the length of the first lead part 13b of the first terminal 13 is roughly the same as the length of the second lead part 14b of the second terminal 14, the length of the first lead part 13b may vary from the length of the second lead part 14b according to the layout pattern of the fuse 10.

Second Embodiment

Figure 6:
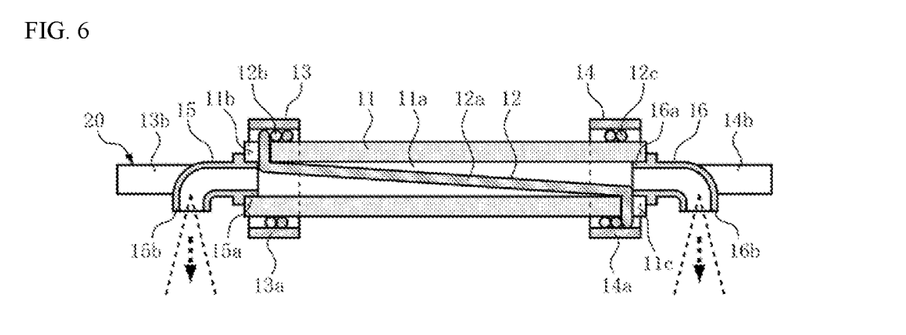
FIG. 6 is a side view of an electronic component fuse representing the second embodiment of the present invention.

The second embodiment shown in FIG. 6 is an embodiment of an electronic component fuse. The structure of the electronic component fuse 20 shown in FIG. 6 (hereinafter simply referred to as "fuse 20") is different from the structure of the fuse 10 shown in FIGS. 1 to 3B in that a first release direction adjustment part 15 that continues to the hollow part 11a is provided on one end of the insulator sleeve 11, and a second release direction adjustment part 16 that continues to the hollow part 11a is provided on the other end of the insulator sleeve 11. The remaining parts are the same as those of the structure of the fuse 10 shown in FIGS. 1 to 3B, and are therefore denoted by the same symbols and not explained.

The first release direction adjustment part 15 and second release direction adjustment part 16 are each made of an insulating tubular part that has been curved in roughly the shape of the letter L, and the former has a connection port 15a and a release port 15b, while the latter also has a connection port 16a and a release port 16b. For the materials of these first release direction adjustment part 15 and second release direction adjustment part 16, any desired insulating material, as selected from the same examples cited for the insulator sleeve 11, may be used. The first release direction adjustment part 15 is fixed with adhesive, etc., in such a way that its connection port 15a is inserted into one end of the insulator sleeve 11, while the second release direction adjustment part 16 is fixed with adhesive, etc., in such a way that its connection port 16a is inserted into the other end of the insulator sleeve 11. The directions of the release ports 15b, 16b of the first release direction adjustment part 15 and second release direction adjustment part 16 can be set as desired when the first release direction adjustment part 15 and second release direction adjustment part 16 are fixed to the insulator sleeve 11.

The first release direction adjustment part 15 and second release direction adjustment part 16 are useful when changing the direction in which the melted debris, etc., of the fusible part 12a is released to the outside together with the heat-expanded air as part of the current cutoff behavior as mentioned above. To be specific, because these first release direction adjustment part 15 and second release direction adjustment part 16 are provided, the direction in which the heat-expanded air and the melted debris, etc., of the fusible part 12a are released can be changed as desired, which in turn prevents the electronic component, etc., that exists around the fuse 20 from receiving heat damage or short-circuiting.

It should be noted that, while, in FIG. 6, the first release direction adjustment part 15 and second release direction adjustment part 16 are provided on both ends of the insulator sleeve 11, respectively, either the first release direction adjustment part 15 or second release direction adjustment part 16 may be eliminated if it is not required according to the layout pattern of the fuse 20. Also, while the first release direction adjustment part 15 and second release direction adjustment part 16 shown in FIG. 6 are each an insulating tubular part that has been curved in roughly the shape of the letter L, any part other than a tubular part, such as a sheet-shaped part or a partially open bag-shaped part, may be used instead so long as the direction in which the heat-expanded air and the melted debris, etc., of the fusible part 12a are released can be changed. In addition, while the part shown in FIG. 6 allows the direction in which the heat-expanded air and the melted debris, etc., of the fusible part 12a are released to be changed by roughly 90 degrees, a part that allows the release direction to be changed to the direction of any sharp angle not exceeding 90 degrees may be used.

Third Embodiment

Figure 7:
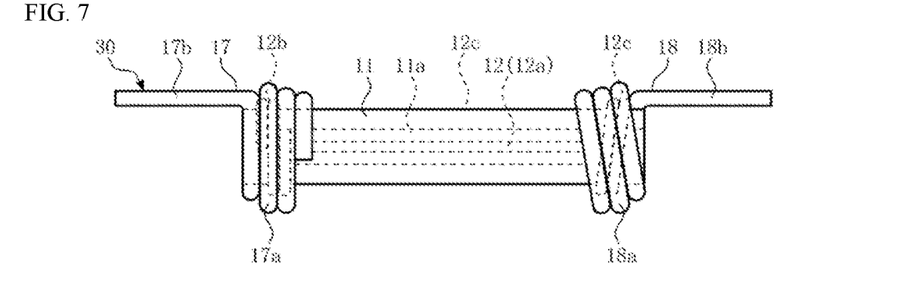
FIG. 7 is a side view of an electronic component fuse representing the third embodiment of the present invention.

The third embodiment shown in FIG. 7 is an embodiment of an electronic component fuse. The structure of the electronic component fuse 30 shown in FIG. 7 (hereinafter simply referred to as "fuse 30") is different from the structure of the fuse 10 shown in FIGS. 1 to 3B in that a first terminal 17 and a second terminal 18 are each constituted by a metal wire. The remaining parts are the same as those of the structure of the fuse 10 shown in FIGS. 1 to 3B, and are therefore denoted by the same symbols and not explained.

The first terminal 17 and second terminal 18 are each constituted by a metal wire with a roughly circular cross-section shape, and the cross-section area of each metal wire is greater than the cross-section area of the conductor element 12. A first connection part 17a of the first terminal 17 is constituted by a part which is wound around the first engagement part 12b of the conductor element 12. Preferably this wound part is tightly wound without any gap left in between, by at least 720 degrees with reference to the center line CL of the hollow part 11a (refer to FIG. 2). Similarly, a second connection part 18a of the second terminal 18 is constituted by a part which is a metal wire wound around the second engagement part 12c of the conductor element 12. Preferably this wound part is tightly wound without any gap left in between, by at least 720 degrees with reference to the center line CL of the hollow part 11a (refer to FIG. 2). Also, a first lead part 17b of the first terminal 17 is constituted by a metal wire part extending outward from the first connection part 17a. Similarly, a second lead part 18b of the second terminal 18 is constituted by a metal wire part extending outward from the second connection part 18a.

It should be noted that the actual diameter of the metal wire of the first terminal 17 and that of the metal wire of the second terminal 18 as shown in FIG. 7 are both 0.3 mm, while the actual length of the first lead part 17b and that of the second lead part 18b are both 2.5 mm.

For the material of the first terminal 17 and that of the second terminal 18, any metal material having conductivity may be used as deemed appropriate. Considering the improvement of current rating and heat generation in an energized state, however, metals with low electrical resistivity, such as copper, silver, gold, aluminum, magnesium, tungsten, zinc, nickel, and alloys thereof, etc., can be used preferably among the metal materials, and metals whose electrical resistivity is $3.0 \times 10^{-8}$ Ωm or less can be used more preferably. Furthermore, the first terminal 17 and second terminal 18 can each be a type constituted by a metal wire on whose surface a film of a different metal has been formed.

Here, one example of how the first terminal 17 and second terminal 18 are produced is introduced. To produce the first terminal 17 and second terminal 18, two metal wires of specified length (hereinafter referred to as "first terminal 17" and "second terminal 18") are prepared. Then, one end of the first terminal 17 is wound around the first engagement part 12b of the conductor element 12 to form a first connection part 17a, while one end of the second terminal 18 is wound around the second engagement part 12c of the conductor element 12 to form a second connection part 18a. Then, by using a tightening die, tightening tool, etc., the first connection part 17a of the first terminal 17 is tightened and connected to the first engagement part 12b of the conductor element 12, and the second connection part 18a of the second terminal 18 is tightened and connected to the second engagement part 12c of the conductor element 12. Needless to say, solder or other joining material may be used to connect the first connection part 17a of the first terminal 17 to the first engagement part 12b of the conductor element 12, while solder or other joining material may also be used to connect the second connection part 18a of the first terminal 18 to the second engagement part 12c of the conductor element 12.

With the fuse 30 shown in FIG. 7, the first lead part 17b of the first terminal 17, and the second lead part 18b of the second terminal 18, each function as an input/output part. The resistance of the first lead part 17b and first connection part 17a of the first terminal 17, the resistance of the first engagement part 12b of the conductor element 12 to which the first connection part 17a of the first terminal 17 has been connected, the resistance of the second lead part 18b and second connection part 18a of the second terminal 18, and the resistance of the second engagement part 12c of the conductor element 12 to which the second connection part 18a of the second terminal 18 has been connected, are all lower than the resistance of the fusible part 12a of the conductor element 12. In other words, the current rating of the fuse 30 depends primarily on the resistance of the fusible part 12a of the conductor element 12, and accordingly the current rating of the fuse 30 can be set to any desired level by changing the cross-section area of the fusible part 12a.

It should be noted that, while, in FIG. 7, the position of the first lead part 17b of the first terminal 17, and the position of the second lead part 18b of the second terminal 18, are not offset in the circumferential direction with reference to the center line CL of the hollow part 11a (refer to FIG. 2), the position of the first lead part 17b of the first terminal 17, and the position of the second lead part 18b of the second terminal 18, may be offset, according to the layout pattern of the fuse 30, in the circumferential direction with reference to the center line CL of the hollow part 11a. Additionally, a first release direction adjustment part 15 and a second release direction adjustment part 16 similar to those of the fuse 20 in FIG. 6 (including variation examples thereof) may be used on the fuse 30.

Fourth Embodiment

Figure 8:
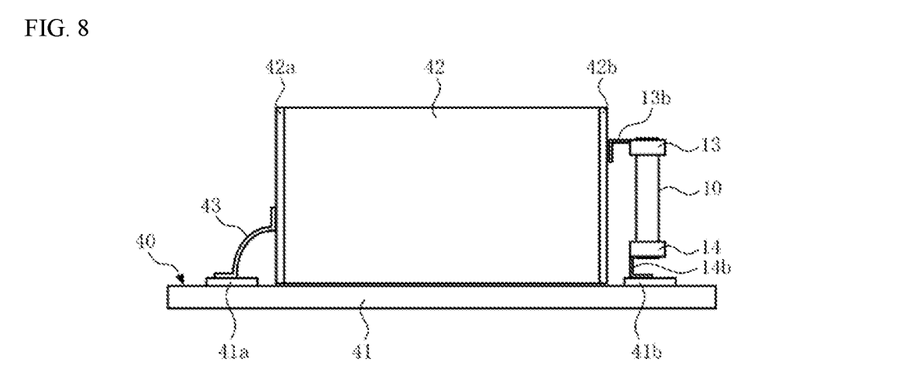
FIG. 8 is a side view of a fuse-equipped electronic component module representing the fourth embodiment of the present invention.

The fourth embodiment shown in FIG. 8 is an embodiment of a fused electronic component module. First, the structure of the fused electronic component module 40 (hereinafter simply referred to as "module 40") is explained using FIG. 8. In this explanation, the left/right direction in FIG. 8 is referred to as "length direction," while the dimension of each constituent along the length direction is referred to as "length."

The module 40 shown in FIG. 8 comprises a board 41, a multilayer ceramic capacitor 42, a terminal 43, and the electronic component fuse 10 shown in FIGS. 1 to 3B (hereinafter simply referred to as "fuse 10").

The board 41 has conductor pads 41a, 41b that respectively correspond to external electrodes 42a, 42b of the multilayer ceramic capacitor 42. For the material of the board 41, silicon dioxide, aluminum oxide, silicon nitride, zirconium oxide, or other ceramic, epoxy resin, phenol resin, polyimide resin, urea resin, melamine resin, unsaturated polyester resin, bis maleimide resin, polyurethane resin, diallyl phthalate resin, silicone resin, cyanate resin, or other thermosetting synthetic resin, or any such thermosetting synthetic resin containing glass filler or other reinforcement filler, may be used, for example. Also, for the material of the conductor pads 41a, 41b, any good conductor whose primary component is nickel, copper, palladium, platinum, silver, gold, or any alloy thereof, etc., may be used, for example.

The multilayer ceramic capacitor 42 has a capacitor body of roughly rectangular solid shape (not accompanied by symbol), as well as external electrodes 42a, 42b provided on both length-direction faces of the capacitor body. The capacitor body has a built-in capacitive part (not accompanied by symbol) which is constituted by multiple internal electrode layers (not illustrated) layered together with dielectric layers (not illustrated) in between, where ends of some of the multiple internal electrode layers are connected to one external electrode 42a, while the ends of the remainder are connected to the other external electrode 42b. For the material of the capacitor body except for each internal electrode layer, any dielectric ceramic whose primary component is barium titanate, strontium titanate, calcium titanate, magnesium titanate, calcium zirconate, calcium zirconate titanate, barium zirconate, titanium oxide, etc., may be used. Also, for the material of each internal electrode layer, any good conductor whose primary component is nickel, copper, palladium, platinum, silver, gold, or any alloy thereof, etc., may be used.

Although not illustrated, the external electrodes 42a, 42b each have a two-layer structure consisting of a base film contacting the exterior face of the capacitor body and a surface film contacting the exterior face of this base film, or a multi-layer structure consisting of a base film, a surface film, and at least one intermediate film in between, or a single-layer structure consisting only of a surface film. The base film is constituted by a baked film or plating film, for example, and any good conductor whose primary component is nickel, copper, palladium, platinum, silver, gold, or any alloy thereof, etc., may be used for the material of this base film. The surface film is constituted by a plating film, for example, and any good conductor whose primary component is copper, tin, palladium, gold, zinc, or any alloy thereof, etc., may be used for the material of this surface film. The intermediate film is constituted by a plating film, for example, and any good conductor whose primary component is platinum, palladium, gold, copper, nickel, or any alloy thereof, etc., may be used for the material of this intermediate film.

The terminal 43 is shaped in such a way that its entire body, constituted integrally by multiple roughly parallel linear parts and a linear part crossing at right angles therewith, is curved, or it is shaped in such a way that its entire body, constituted by a thin sheet material, is curved. One end of the terminal 43 is connected to one external electrode 42a using solder or other joining material (not illustrated), while the other end of the terminal 43 is connected to one conductor pad 41a using solder or other joining material (not illustrated). For the material of the terminal 43, nickel, copper, palladium, platinum, silver, gold, or any alloy thereof, or any other metal, may be used, for example. Also, for the joining material, any leaded solder (such as tin-lead alloy, etc.) or unleaded solder (such as tin-silver alloy, tin-silver-copper alloy, tin-silver-bismuth-indium alloy, tin-silver-copper-nickel-germanium alloy, tin-copper alloy, tin-copper-nickel-germanium alloy, tin-bismuth alloy, tin-bismuth-silver alloy, tin-bismuth-copper alloy, gold-tin alloy, etc.) may be used.

The structure of the fuse 10 was described earlier using FIGS. 1 to 3B. The first lead part 13b of the first terminal 13 of the fuse 10 is connected to the other external electrode 42b using solder or other joining material (not illustrated) similar to the above, while the second lead part 14b of the second terminal 14 is connected to the other conductor pad 41b using solder or other joining material (not illustrated) similar to the above. As is evident from FIG. 9, the first lead part 13b of the first terminal 13 and the second lead part 14b of the second terminal 14 are bent for ease of connection. For this fuse 10, a fuse having a current rating higher than the current rating of the multilayer ceramic capacitor 42 is used.

Next, the current cutoff behavior of the aforementioned module 40, and the effects achieved by the module 40, are explained.

Assume that one conductor pad 41a of the module 40 is the input side and the other conductor pad 41b is the output side, and that current exceeding the current rating of the multilayer ceramic capacitor 42, or "abnormal current," is input to the multilayer ceramic capacitor 42 and a failure (such as short-circuiting of an internal electrode layer, etc.) occurs in the multilayer ceramic capacitor 42 and consequently the abnormal current is input to the fuse 10; in this case, the fuse 10 cuts off this abnormal current roughly at the same time as it is input, based on the current cutoff behavior described above, and this means that, if a circuit (not illustrated) is connected to the module 40, this circuit is protected.

Assume that, contrary to the above, the other conductor pad 41b of the module 40 is the input side and one conductor pad 41a is the output side, and that current exceeding the current rating of the multilayer ceramic capacitor 42, or "abnormal current," is input to the multilayer ceramic capacitor 42 through the fuse 10; in this case, the fuse 10 cuts off this abnormal current roughly at the same time as it is input, based on the current cutoff behavior described above, and the multilayer ceramic capacitor 42 is protected as a result, and if a circuit (not illustrated) is connected to the module 40, this circuit is also protected.

Next, variation examples of the aforementioned module 40 are explained.

Variation Example 1

Figure 9:
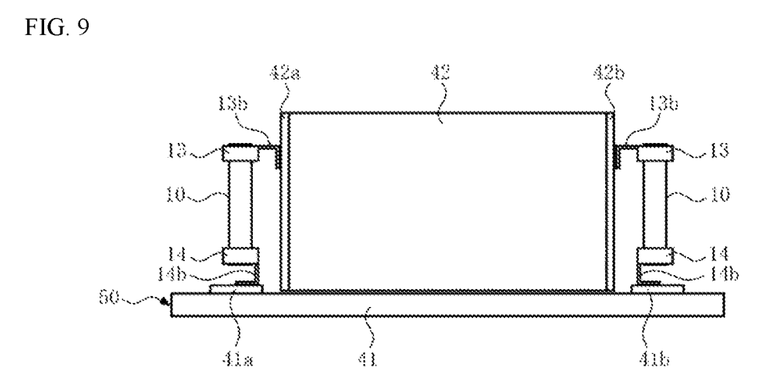
FIG. 9 is a drawing showing a variation example of the fuse-equipped electronic component module shown in FIG. 8.

While the module 40 shown in FIG. 8 uses a fuse 10 for either the input side or output side, a module 50 using fuses 10 for both the input side and output side may be constituted as shown in FIG. 9.

Variation Example 2

While the module 40 shown in FIG. 8 uses one fuse 10 for either the input side or output side, and the module 50 shown in FIG. 9 uses one fuse 10 for both the input side and output side, the module 40 may have multiple fuses 10 connected in parallel for either the input side or output side, and the module 50 may have multiple fuses 10 connected in parallel for both the input side and output side.

Variation Example 3

While the fuse 10 shown in FIGS. 1 to 3B is used in the modules 40, 50 shown in FIGS. 8 and 9, effects similar to the above can also be achieved using the fuse described in any of the variation examples of the fuse 10, or fuse 20 shown in FIG. 6 (or any of its variation examples), or fuse 30 shown in FIG. 7 (or any of its variation examples).

Variation Example 4

While the fuse 10 shown in FIGS. 1 to 3B is positioned vertically in FIGS. 8 and 9, the fuse 10 may be positioned laterally or in other orientations if the height dimension of the multilayer ceramic capacitor 42 is small.

Variation Example 5

While the electronic components shown in FIGS. 8 and 9 are each a multilayer ceramic capacitor 42 having a pair of external electrodes 42a, 42b, effects similar to the above can also be achieved by a module with a multilayer ceramic capacitor having three or more external electrodes instead of this multilayer ceramic capacitor 42, or by a module using an electronic component which has at least two external electrodes but which is not a multilayer ceramic capacitor.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-089795, filed Apr. 27, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. An electronic component fuse comprising:
 (1) an insulator sleeve having a hollow part that extends in an axial direction and is open, at both ends, to an exterior of the electronic component fuse;
 (2) a conductor element having a fusible part whose cross-section area is smaller than a cross-section area of the hollow part of the insulator sleeve, a first engagement part provided at one end of the fusible part, and a second engagement part provided at another end of the fusible part, where the fusible part is positioned in the hollow part of the insulator sleeve, the first engagement part is disposed on one end of the insulator sleeve, and the second engagement part is disposed on another end of the insulator sleeve;
 (3) a first terminal having a first connection part and a first lead part, with the first connection part connected to the first engagement part of the conductor element; and
 (4) a second terminal having a second connection part and a second lead part, with the second connection part connected to the second engagement part of the conductor element,
 wherein the first and second terminals are disposed outside the hollow part, radially, and
 wherein both ends of the electronic component fuse are open to the exterior of the electronic component fuse in a manner such that when the fusible part is blown, melted debris and evaporated residues of the fusible part are released to the exterior through both ends of the hollow part together with heat-expanded air in the hollow part.

2. An electronic component fuse according to claim 1, wherein a length of the fusible part of the conductor element is shorter than a length of the insulator sleeve, the one end of the fusible part of the conductor element is positioned inward of one end of the hollow part of the insulator sleeve, and the other end of the fusible part of the conductor element is positioned inward of an other end of the hollow part of the insulator sleeve.

3. An electronic component fuse according to claim 2, wherein the fusible part of the conductor element is positioned at an angle to a center line of the hollow part of the insulator sleeve.

4. An electronic component fuse according to claim 2, wherein the conductor element is formed by a metal wire, the first engagement part of the conductor element is constituted by a part where one end of the metal wire is wound around an outer periphery of the one end of the insulator sleeve, and the second engagement part of the conductor element is constituted by a part where an other end of the metal wire is wound around an outer periphery of the other end of the insulator sleeve.

5. An electronic component fuse according to claim 2, wherein the cross-section area of the fusible part of the conductor element is set to a range of 1 to 64% of the cross-section area of the hollow part of the insulator sleeve.

6. An electronic component fuse according to claim 2, wherein a release direction adjustment part that continues to the hollow part is provided on at least one of the one end and the other end of the insulator sleeve.

7. A fused electronic component module comprising:
 an electronic component having at least two external electrodes;
 a board having conductor pads that respectively correspond to the external electrodes of the electronic component; and
 at one electronic component fuse according to claim 2;
 wherein the first lead part of the first terminal, and the second lead part of the second terminal, of the electronic component fuse, are connected to at least one of the external electrodes of the electronic component and to a corresponding conductor pad on the board, respectively.

8. A fused electronic component module according to claim 7, wherein the electronic component is a multilayer ceramic capacitor.

9. An electronic component fuse according to claim 1, wherein the cross-section area of the fusible part of the conductor element is set to a range of 1 to 64% of the cross-section area of the hollow part of the insulator sleeve.

10. A fused electronic component module comprising:
an electronic component having at least two external electrodes;
a board having conductor pads that respectively correspond to the external electrodes of the electronic component; and
at one electronic component fuse according to claim 1;
wherein the first lead part of the first terminal, and the second lead part of the second terminal, of the electronic component fuse, are connected to at least one of the external electrodes of the electronic component and to a corresponding conductor pad on the board, respectively.

11. A fused electronic component module according to claim 10, wherein the electronic component is a multilayer ceramic capacitor.

12. An electronic component fuse comprising:
(1) an insulator sleeve having a hollow part that opens to an exterior at both ends;
(2) a conductor element having a fusible part whose cross-section area is smaller than a cross-section area of the hollow part of the insulator sleeve, a first engagement part provided at one end of the fusible part, and a second engagement part provided at another end of the fusible part, where the fusible part is positioned in the hollow part of the insulator sleeve, the first engagement part is disposed on one end of the insulator sleeve, and the second engagement part is disposed on another end of the insulator sleeve;
(3) a first terminal having a first connection part and a first lead part, with the first connection part connected to the first engagement part of the conductor element; and
(4) a second terminal having a second connection part and a second lead part, with the second connection part connected to the second engagement part of the conductor element,
wherein the fusible part of the conductor element is positioned at an angle to a center line of the hollow part of the insulator sleeve.

13. An electronic component fuse according to claim 12, wherein the conductor element is formed by a metal wire, the first engagement part of the conductor element is constituted by a part where one end of the metal wire is wound around an outer periphery of the one end of the insulator sleeve, and the second engagement part of the conductor element is constituted by a part where an other end of the metal wire is wound around an outer periphery of the other end of the insulator sleeve.

14. An electronic component fuse according to claim 12, wherein the cross-section area of the fusible part of the conductor element is set to a range of 1 to 64% of the cross-section area of the hollow part of the insulator sleeve.

15. An electronic component fuse according to claim 12, wherein a release direction adjustment part that continues to the hollow part is provided on at least one of the one end and the other end of the insulator sleeve.

16. A fused electronic component module comprising:
an electronic component having at least two external electrodes;
a board having conductor pads that respectively correspond to the external electrodes of the electronic component; and
at one electronic component fuse according to claim 12;
wherein the first lead part of the first terminal, and the second lead part of the second terminal, of the electronic component fuse, are connected to at least one of the external electrodes of the electronic component and to a corresponding conductor pad on the board, respectively.

17. A fused electronic component module according to claim 16, wherein the electronic component is a multilayer ceramic capacitor.

18. An electronic component fuse comprising:
(1) an insulator sleeve having a hollow part that opens to an exterior at both ends;
(2) a conductor element having a fusible part whose cross-section area is smaller than a cross-section area of the hollow part of the insulator sleeve, a first engagement part provided at one end of the fusible part, and a second engagement part provided at another end of the fusible part, where the fusible part is positioned in the hollow part of the insulator sleeve, the first engagement part is disposed on one end of the insulator sleeve, and the second engagement part is disposed on another end of the insulator sleeve;
(3) a first terminal having a first connection part and a first lead part, with the first connection part connected to the first engagement part of the conductor element; and
(4) a second terminal having a second connection part and a second lead part, with the second connection part connected to the second engagement part of the conductor element,
wherein the conductor element is formed by a metal wire, the first engagement part of the conductor element is constituted by a part where one end of the metal wire is wound around an outer periphery of the one end of the insulator sleeve, and the second engagement part of the conductor element is constituted by a part where an other end of the metal wire is wound around an outer periphery of the other end of the insulator sleeve.

19. An electronic component fuse comprising:
(1) an insulator sleeve having a hollow part that opens to an exterior at both ends;
(2) a conductor element having a fusible part whose cross-section area is smaller than a cross-section area of the hollow part of the insulator sleeve, a first engagement part provided at one end of the fusible part, and a second engagement part provided at another end of the fusible part, where the fusible part is positioned in the hollow part of the insulator sleeve, the first engagement part is disposed on one end of the insulator sleeve, and the second engagement part is disposed on another end of the insulator sleeve;
(3) a first terminal having a first connection part and a first lead part, with the first connection part connected to the first engagement part of the conductor element; and
(4) a second terminal having a second connection part and a second lead part, with the second connection part connected to the second engagement part of the conductor element,
wherein a release direction adjustment part that continues to the hollow part is provided on at least one of the one end and the other end of the insulator sleeve.

* * * * *

UNITED STATES PATENT AND TRADEMARK OFFICE
CERTIFICATE OF CORRECTION

PATENT NO. : 10,224,707 B2
APPLICATION NO. : 15/497017
DATED : March 5, 2019
INVENTOR(S) : Yousuke Nakada et al.

It is certified that error appears in the above-identified patent and that said Letters Patent is hereby corrected as shown below:

In the Claims

At Column 16, Line 54, in Claim 7, please delete "at one" and insert therefor --at least one--.

At Column 17, Line 7, in Claim 10, please delete "at one" and insert therefor --at least one--.

Signed and Sealed this
Sixteenth Day of July, 2019

Andrei Iancu
*Director of the United States Patent and Trademark Office*